United States Patent Office 2,991,694
Patented July 11, 1961

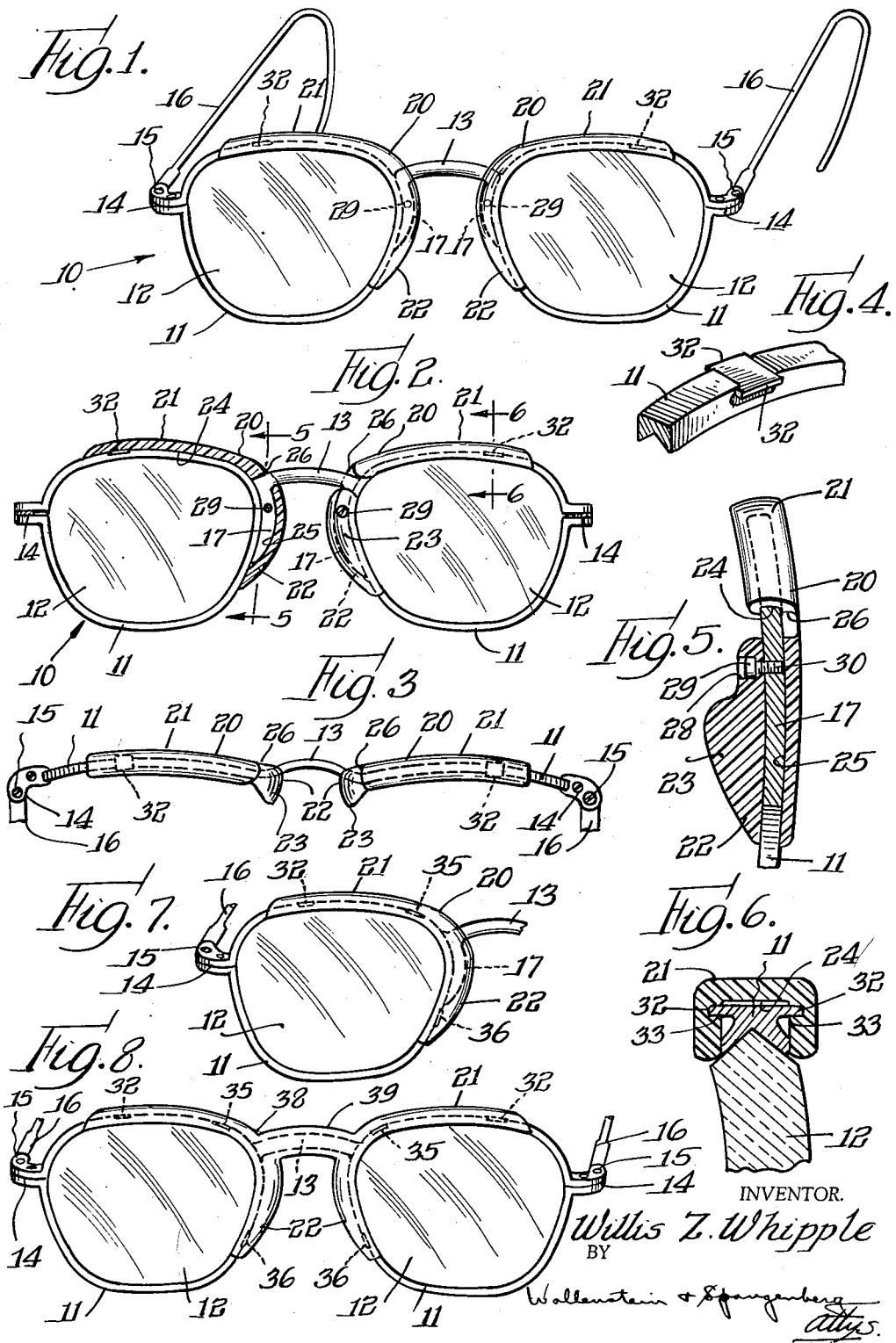

2,991,694
BROW TRIM AND NOSE PAD CONSTRUCTION FOR SPECTACLES OR THE LIKE
Willis Z. Whipple, Chicago, Ill., assignor to Chicago Eye Shield Company, Chicago, Ill., a corporation of Illinois
Filed Nov. 28, 1956, Ser. No. 624,801
9 Claims. (Cl. 88—41)

The principal object of this invention is to provide a single piece brow trim and nose pad member for spectacles or the like, which may be readily and simply detachably secured in place on the spectacles or the like, which may be inexpensively manufactured, which may have various nose pad surface arrangements so as to be interchangeable to fit more readily the nose of the wearer, which is particularly adaptable for use with spectacles or the like of the industrial type, which minimizes stocking problems where large numbers of spectacles or the like are used in industrial operations, and which is pleasing in appearance.

Further objects of this invention reside in the details of construction of the brow trim and nose pad member, its relationship with the spectacles and the manner of securing the same in place upon the spectacles.

Other objects and advantages of this invention will become apparent to those skilled in the art upon reference to the accompanying specification, claims and drawing in which:

FIG. 1 is a front view of a pair of spectacles or the like with one form of the brow trim and nose pad members applied thereto;

FIG. 2 is a rear view of the spectacles illustrated in FIG. 1 and showing one of the brow trim and nose pad members in vertical section;

FIG. 3 is a top plan view of the spectacles illustrated in FIGS. 1 and 2;

FIG. 4 is a partial perspective view of the brow portion of a lens receiving rim of the spectacles or the like showing the manner in which the same is provided with lateral extensions which are utilized for detachable securing purposes;

FIG. 5 is an enlarged sectional view taken substantially along the line 5—5 of FIG. 2;

FIG. 6 is an enlarged sectional view taken substantially along the line 6—6 of FIG. 2;

FIG. 7 is a front view of a part of a pair of spectacles illustrating another form of the brow trim and nose pad member applied thereto;

FIG. 8 is a front view of a pair of spectacles illustrating still another form of the brow trim and nose pad member applied thereto wherein a single member is utilized for both of the lens receiving rims of the spectacles.

A pair of spectacles, having, for example, an FV-7 lens shape, is generally designated at 10. It includes a pair of metallic lens receiving rims 11 for receiving lenses 12, the lens receiving rims 11 being connected together by a metal bridge piece 13. The lens receiving rims 11 have a brow portion to one side of the bridge piece 13 and a nasal portion to the other side thereof. The outer temple portions of the lens receiving rims 11 are preferably split and provided with temple members 14 which are drawn together by temple screws 15 for securing the lenses 12 in place within the lens receiving rims, as is conventional in the art. The screws 15 also carry temples 16 for holding the spectacles in place upon the face of the wearer. As shown more clearly in FIGS. 2 and 5, the bridge piece 13 may be provided with a pair of extensions 17 which engage the lens receiving lens 11. These extensions 17 provide an enlarged area for soldering the lens receiving rims 11 to the bridge piece 13 to produce maximum strength in these joints.

In accordance with one form of this invention, the spectacles 10 are provided with a pair of single piece brow trim and nose pad members 20 which are preferably formed from synthetic plastic material such as cellulose acetate, polystyrene or the like, where a relatively rigid member is desired, or polyethylene or the like where a relatively flexible member is desired. These members 20 may be clear or cloudy in appearance, or transparent, translucent or opaque, or colored, as desired. Each single piece brow trim and nose pad member 20 has a brow trim portion 21 which overlies the brow portion of the lens receiving rim 11, and a nose pad portion 22 which overlies the nose piece projection 17 and the nasal portion of the lens receiving rim 11. The nose pad portion 22 of the member is rearwardly provided with a raised surface 23 to fit the nose of the wearer. These raised surfaces 23 may be of varying configuration and shape so that various single piece brow trim and nose pad members 20 may be selected so as to fit properly the nose of the wearer.

Preferably, the brow trim portion 21 of the member is provided with a groove 24 which receives the brow portion of the lens receiving rim 11, and likewise the nose pad portion 22 of the member is provided with a groove 25 for receiving the nose piece extension 17 and the nasal portion of the lens receiving rim 11. The member 20 between the brow trim portion 21 and the nose pad portion 22 is provided at its rear and at its inner side with a notch 26 for accommodating the nose piece 13. Thus, the single piece brow trim and nose pad member 21 is mounted on the spectacles with the lens receiving rim 11 and the bridge piece extension 17 received within the grooves 24 and 25.

Means are provided for detachably securing the single piece brow trim and nose pad member 20 in place upon the lens receiving rim 11, preferably the nose pad portion of the member and the brow trim portion of the member, each being provided with a detachable securing means so as to secure the member firmly in place. Toward this end the rear of the nose pad portion 22 of the member is provided with a counter-sunk hole 28 which receives a headed screw 29 which, in turn, is threaded into a tapped hole 30 in the bridge piece extension 17. This screw 29 may be the same kind of screw as the screws 15 which are utilized for mounting the temples 16 and securing together the split ends of the lens receiving rims 11. By using the same kind of screw 29 for this purpose, stocking of such parts is, therefore, reduced. The nose piece extension 17, in addition to providing a strong joint between the nose piece 13 and the lens receiving rim 11, also provides a firm anchor for the nose pad portion 22 of the member and operates effectively to prevent distortion or tilting of that portion.

As shown more clearly in FIGS. 4 and 6, the brow portion of the lens receiving rim 11 is provided with a pair of lateral projections 32 which are formed therein by deforming the metal lens receiving rim thereat. In so doing, a suitable tool is utilized to force the lateral faces of the lens receiving rim inwardly and to force the outer face of the rim inwardly to extrude or deform the intermediate portions of the lens receiving rim outwardly into the lateral projections 32. The groove 24 in the brow trim portion 21 of the member 20 is provided with a pair of undercut recesses 33 which receive the lateral projections 32 of the lens receiving rim 11. These lateral projections 32 may be snapped into and out of the undercut recesses 33 and operate effectively to detachably secure the brow trim portion 21 of the member 20 to the brow portion of the lens receiving rim 11.

The form of the single piece brow trim and nose pad member 20, illustrated in FIG. 7, is very much like that illustrated in FIGS. 1 to 6 and, accordingly, like reference characters have been utilized for like parts. The arrangement of FIG. 7 differs from that of FIGS. 1 to 6 in that the holes 28 and 30 in the nose pad portion 22 of the member and in the bridge piece extension 17 are ommitted. Instead, the brow portion of the lens receiving rim 11 is additionally provided with lateral projections 35 adjacent the nose piece 13, and the nasal portion of the lens receiving rim 11 is provided with lateral projections 36. The grooves in the brow trim portion and the nose pad portion of the member are also provided with undercut recesses for receiving the lateral projections 35 and 36. Thus, in the arrangement of FIG. 7 the single piece brow trim and nose pad member 20 may be snapped on and off of the lens receiving rim 11, and when it is snapped into place it is firmly held in place at three positions by the lateral projections 32, 35 and 36.

The arrangement of FIG. 8 is also quite similar to the arrangements of FIGS. 1 to 6 and 7, and here, also, like reference characters have been utilized for like parts. Here, however, a single unit is provided for both lens receiving rims 11 of the spectacles. The single unit is designated at 38, and it includes a pair of brow trim portions 21 overlying the brow portions of the lens receiving rims 11, a pair of nose pad portions 22 overlying the nasal portions of the lens receiving rims 11, and a bridge portion 39 overlying the bridge piece 13 of the spectacles. Thus, the two halves of the unit associated with the lens receiving rims 11 are integrally connected together by the bridge portion 39. Here, as in FIG. 7, the unit 38 is snapped into place on the spectacles by means of the lateral projections 32, 35 and 36. Here, also, the bridge piece extensions 17 are omitted, but if it is desired for strength purposes to include the bridge piece extensions, they may be readily included as in FIG. 7.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. In spectacles or the like having a bridge piece and lens receiving rims secured to and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the nasal portion only of the lens receiving rim and a raised surface to fit the nose of the wearer, and a notch between the brow trim and nose pad portions to accommodate the bridge piece, and means for detachably securing the member in place upon the lens receiving rim.

2. In spectacles or the like having a bridge piece and lens receiving rims secured to and connected together by the bridge piece and provided with brow portions to one side of the bridge piece and with nasal portions to the other side thereof and temples pivotally secured to outer temple portions of the lens receiving rims, a single piece brow trim and nose pad member having a pair of brow trim portions provided with grooves receiving the brow portions only of the lens receiving rims, a pair of nose pad portions provided with grooves receiving the nasal portions only of the lens receiving rims and raised surfaces to fit the nose of the wearer, a bridge portion overlying the bridge piece, and notches adjacent the bridge portion to accommodate the bridge piece, and means for detachably securing the member in place upon the lens receiving rims.

3. In spectacles or the like having a bridge piece provided with an extension at each end and lens receiving rims secured to the extensions and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the bridge piece extension and the nasal portion only of the lens receiving rim and a raised surface to fit the nose of the wearer, and a notch between the brow trim and nose pad portions to accommodate the bridge piece, and means for detachably securing the member in place upon the lens receiving rim including a screw extending through a hole in the nose pad portion of the member and threaded in a tapped hole in the bridge piece extension.

4. In spectacles or the like having a bridge piece and lens receiving rims secured to and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the nasal portion only of the lens receiving rim and a raised surface to fit the nose of the wearer, and a notch between the brow trim and nose pad portions to accommodate the bridge piece, and means for detachably securing the member in place upon the lens receiving rim, including lateral projections on the lens receiving rim and undercut recesses in the groove receiving the projections.

5. In spectacles or the like having a bridge piece and lens receiving rims secured to and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the nasal portion only of the lens receiving rim and a raised surface to fit the nose of the wearer, and a notch between the brow trim and nose pad portions to accommodate the bridge piece, and means for detachably securing the member in place upon the lens receiving rim, including lateral projections on the brow portion and the nasal portion of the lens receiving rims and undercut recesses in the grooves in the brow trim portion and nose pad portions of the member receiving the projections.

6. In spectacles or the like having a bridge piece provided with an extension at each end and lens receiving rims secured to the extensions and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the bridge piece extension and the nasal portion only of the lens receiving rim and a raised surface to fit the nose of the wearer, and a notch between the brow trim and nose pad portions to accommodate the bridge piece, and means for detachably securing the member in place upon the lens receiving rim, including a screw extending through a hole in the nose pad portion of the member and threaded in a tapped hole in the bridge piece extension, lateral projections on the brow portion of the lens receiving rim and undercut recesses in the groove in the brow trim portion of the member receiving the projections.

7. In spectacles or the like having a bridge piece provided with an extension at each end and lens receiving rims secured to the extensions and connected together by the bridge piece and provided with brow portions to one side of the bridge piece and with nasal portions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the bridge piece extension and the nasal portion only of the lens receiving rim and a raised surface to fit the nose of the wearer, and a notch between the brow trim and nose pad portions to accommodate the bridge piece, and means for detachably securing the member in place upon the lens receiving rim including lateral projections on the brow portion and the nasal portion of the lens receiving rim and undercut recesses in the grooves in the brow trim portion and nose pad portion of the member receiving the projections.

8. In spectacles or the like having a bridge piece and lens receiving rims secured to and connected together by the bridge piece and provided with brow portions to one side of the bridge piece and with nasal portions to the other side thereof and temples pivotally secured to outer temple portions of the lens receiving rims, a single piece brow trim and nose pad member having a pair of brow trim portions provided with grooves receiving the brow portions only of the lens receiving rims, a pair of nose pad portions provided with grooves receiving the nasal portions only of the lens receiving rims and raised surfaces to fit the nose of the wearer, a bridge portion overlying the bridge piece, and notches adjacent the bridge portion to accommodate the bridge piece, and means for detachably securing the member in place upon the lens receiving rims, including lateral projections on the brow portions and nasal portions of the lens receiving rims and undercut recesses in the grooves in the brow trim portions and nose pad portions of the member receiving the projections.

9. In spectacles or the like having a bridge piece provided with an angular extension at each end and lens receiving rims secured to said angular extensions and connected together by the bridge piece and provided with brow portions to one side of the bridge piece and with nasal portions including said angular extensions to the other side thereof and temples pivotally secured to outer temple portions of the lens receiving rims, a single piece brow trim and nose pad member having a brow trim portion provided with a groove receiving the brow portion only of a lens receiving rim, a nose pad portion provided with a groove receiving the bridge piece extension and the nasal portion only of the lens receiving rim and a raised surface to fit the nose of the wearer, and a notch between the brow trim and nose pad portions to accommodate the bridge piece, and means for detachably securing the member in place upon the lens receiving rim.

References Cited in the file of this patent

UNITED STATES PATENTS

| | | |
|---|---|---|
| 1,278,431 | Bugbee | Sept. 10, 1918 |
| 1,335,318 | Day | Mar. 30, 1920 |
| 1,600,605 | Stevens | Sept. 21, 1926 |
| 2,463,041 | Malcom | Mar. 1, 1949 |
| 2,627,783 | Splaine | Feb. 10, 1953 |
| 2,756,631 | Page | July 31, 1956 |

FOREIGN PATENTS

| | | |
|---|---|---|
| 369,904 | Great Britain | Mar. 29, 1932 |
| 704,696 | Great Britain | Feb. 24, 1954 |